(12) United States Patent
Joshi

(10) Patent No.: US 10,157,039 B2
(45) Date of Patent: Dec. 18, 2018

(54) AUTOMATIC CAPTURING OF MULTI-MODE INPUTS IN APPLICATIONS

(71) Applicant: Motorola Mobility LLC, Chicago, IL (US)

(72) Inventor: Sharad Joshi, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 432 days.

(21) Appl. No.: 14/874,540

(22) Filed: Oct. 5, 2015

(65) Prior Publication Data

US 2017/0097806 A1  Apr. 6, 2017

(51) Int. Cl.
| | |
|---|---|
| G06F 3/16 | (2006.01) |
| H04R 29/00 | (2006.01) |
| G06F 3/0488 | (2013.01) |
| H04L 12/58 | (2006.01) |
| H04M 1/725 | (2006.01) |
| H04N 21/4788 | (2011.01) |

(52) U.S. Cl.
CPC ........... G06F 3/167 (2013.01); H04R 29/004 (2013.01); *G06F 3/0488* (2013.01); *G06F 2203/0381* (2013.01); *H04L 51/04* (2013.01); *H04M 1/72552* (2013.01); *H04N 21/4788* (2013.01)

(58) Field of Classification Search
CPC ............. G06F 3/167; G06F 2203/0381; G06F 3/0488; G06F 3/04886; H04R 29/004; H04L 51/04; H04M 1/72552; H04N 21/4788; G10L 15/26
See application file for complete search history.

(56) References Cited

U.S. PATENT DOCUMENTS

| | | | | |
|---|---|---|---|---|
| 2013/0023311 A1* | 1/2013 | Wang | .................. | G06F 3/04886 455/566 |
| 2013/0275138 A1* | 10/2013 | Gruber | .................... | G10L 13/00 704/260 |
| 2014/0163978 A1* | 6/2014 | Basye | ..................... | G10L 15/28 704/233 |
| 2015/0133197 A1* | 5/2015 | Kwak | ............... | H04M 1/72519 455/563 |
| 2015/0312182 A1* | 10/2015 | Langholz | ................ | H04L 51/04 715/753 |

* cited by examiner

*Primary Examiner* — Jeffrey A Gaffin
*Assistant Examiner* — Bille M Dahir
(74) *Attorney, Agent, or Firm* — Yudell Isidore PLLC

(57) ABSTRACT

A method includes: detecting activation, on a device, of a content capturing and presenting (CCP) interface for receiving content that can be inputted via both speech-input and tactile-input; and in response to the activation, automatically enabling both (i) a tactile input mechanism for capturing tactile inputs and (ii) a microphone for capturing audible speech inputs. The method further includes: monitoring for detection of one of (i) a tactile input, which involves use of the tactile input mechanism to input the content and (ii) audible speech, which triggers use of the microphone to input the content; and in response to detecting audible speech: closing the tactile input mechanism; capturing the audible speech via the microphone; and presenting content corresponding to the audible speech within the CCP interface.

18 Claims, 12 Drawing Sheets

AUTOMATIC CAPTURING OF MULTI-MODE INPUTS IN APPLICATIONS

BACKGROUND

1. Technical Field

The present disclosure generally relates to interfacing with applications executing on user devices, and in particular to a method and device for automated capture of inputs within an interface of an application executing on a user device.

2. Description of the Related Art

One very common usage of electronic user devices, such as smart phones, tablets, and computers, is for execution of applications that require a user to provide textual inputs into a user interface. Increasingly, these devices are being provided with microphones and the capability to provide speech input in addition to and/or in place of textual inputs. This usage is becoming increasing popular with standard messaging applications, such as provided with short message service (SMS) or instant messaging applications. Many of the user interfaces for these applications now provide a virtual microphone displayed within the message interface or as a selectable icon included on a virtual keyboard. However, the default input mechanism for these applications have remained the keyboard, which requires tactile manipulation of the device. Thus, access to the microphone and, by extension, access to speech-based interfacing with these applications, first require a manual or tactile input to open the message interface and or reply message, manually activate the keyboard, and then, if speech input is desired, manually activate and/or select the microphone as an input mechanism. Given that the microphone is a preferred means of some users for providing input to these applications, the experience is fragmented and mostly manual user interface and/or touch driven, although the user ultimately wants or prefers to use speech as the means for providing the input. Similar limitations exist in other computer applications such as traditional word processing software and other applications that receive text-based input, but which can be manually configured to support user dictation of speech input.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
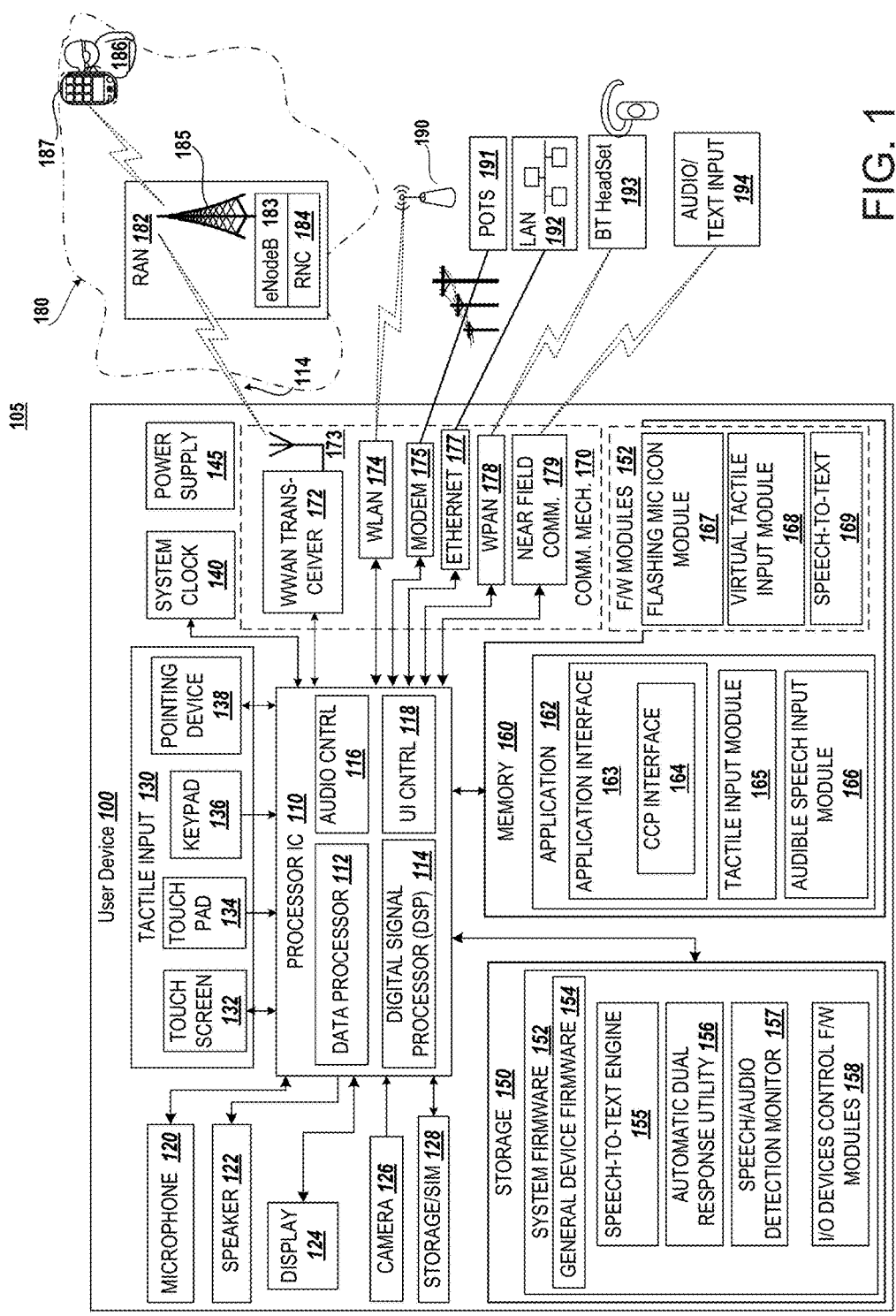
FIG. 1 provides a block diagram representation of an example electronic device configured with various hardware, firmware and software components that enable various features of the disclosure, according to one or more embodiments.

The illustrative embodiments of the present disclosure provide a method and device that enables automatic activation of both a tactile input mechanism and a speech input mechanism in response to opening of an application interface that allows for receipt of both types of inputs.

According to one aspect, the method includes: detecting activation, on a device, of a content capturing and presenting (CCP) interface for receiving content that can be inputted via both speech-input and tactile-input; and in response to the activation, automatically enabling both (i) a tactile input mechanism for capturing tactile inputs and (ii) a microphone for capturing audible speech inputs. The method further includes: monitoring for detection of one of (i) a tactile input, which involves use of the tactile input mechanism to input the content and (ii) audible speech, which triggers use of the microphone to input the content; and in response to detecting audible speech: closing the tactile input mechanism; capturing the audible speech via the microphone; and presenting content corresponding to the audible speech within the CCP interface.

In the following detailed description of exemplary embodiments of the disclosure, specific exemplary embodiments in which the various aspects of the disclosure may be practiced are described in sufficient detail to enable those skilled in the art to practice the invention. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and firmware and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices and/or components may be used in addition to or in place of the hardware and/or firmware depicted. The depicted example is not meant to imply architectural or other limitations with respect to the presently described embodiments and/or the general disclosure.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Also, within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

Turning now to FIG. 1, there is depicted a block diagram representation of an example device 100 shown communicatively connected within an example communication environment 105 via one or more of a plurality of communication mechanisms 170. Device 100 includes hardware, firmware, and software components, several of which are utilized to enable implementation of various features of the disclosure. According to one important aspect, device 100 includes voice/speech input and/or audio input components that can be automatically activated to enable voice/speech initiation of the input mechanisms associated with an application. The device 100 can be one of a host of different types of devices, including but not limited to, a mobile cellular phone or smart-phone, a laptop, a net-book, an ultra-book, and/or a tablet computing device, or even a general desktop or server computing device. These various devices all provide and/or include the necessary hardware and software to enable tactile input and speech input to an executing application. Additionally, in embodiments that support message exchange via a wired or wireless network, device 100 includes the hardware, firmware, and/or software required to support the various wireless or wired communication functions as part of a multi-participant communication environment.

Referring now to the specific illustrated components that make up device 100, device 100 can include a processor integrated circuit (IC) 110, which is physically connected, via a plurality of bus interconnects (illustrated by the uni-directional and bi-directional arrows), to a plurality of functional components of device 100. Processor IC 110 can include one or more programmable microprocessors, such as a data processor 112 and a digital signal processor (DSP) 110, which may both be integrated into a single processing device, in some embodiments. Processor IC 110 can also include one or more controllers, such as user interface (UI) controller 116 and audio controller 118. These controllers can be functional modules within data processor 112, in one embodiment. The processor IC 110 controls the communication, user interface features, and other functions and/or operations of device 100. These functions and/or operations thus include, but are not limited to, application data processing and signal processing. The present innovation can be implemented using hardware component equivalents such as special purpose hardware, dedicated processors, general purpose computers, microprocessor based computers, micro-controllers, optical computers, analog computers, dedicated processors and/or dedicated hard wired logic. Additionally, as described herein, certain user interfacing aspects can be completed by UI controller 116, which for purposes of the disclosure is represented as a physical controller communicatively connected to the user interface components, such as the touch screen of the device. In alternate embodiments, the functionality of UI controller 116 can be provided as a module of code that is executed by the processor 112 to generate specific control aspects of the user interfacing functions of the device. Additionally, when UI controller 116 is a separate physical device, UI controller 116 can be located in another location within device, and not necessarily on processor IC 110, as shown.

Device 100 includes a plurality of input/output (I/O) devices, including at least one audio input device, microphone 120, at least one audio output device, speaker 122, display 124, camera 126, subscriber identity module (SIM) and/or storage card 128, and at least one tactile input mechanism 130. When device 100 is a mobile phone that incorporates a SIM 128, SIM 128 provides unique identification of the subscriber that owns or utilizes the device 100, as well as specific additional information associated with the particular subscriber and/or service. According to one aspect of the disclosure, the tactile input mechanism 130 provides text content in response to user manipulation of an input affordance that is associated with one of the device and an executing application. The tactile input mechanism 130 can include a touch screen 132, which can be utilized to display a one or more of a virtual keyboard/keypad, a touchpad, or a swype screen. Tactile input mechanism 130 can also include a physical touch pad 134, a physical keyboard or keypad 136, and/or a pointing device 138. While shown as a physical component of device 100, pointing device 138, such as a mouse or stylus, is typically externally connected to device 100 via a wired or wireless communication interface. Similarly, when device is a not a singular device, such as a mobile phone, tablet, or laptop, several others of the I/O components can be located external to physical device casing (not shown) housing the processor IC 110. Device 100 also includes system clock 140, which serves as a chronometer or basis for all timers, as utilized in the disclosed embodiments. Also, power supply 145 provides required power for operating the individual components within device 100 and, by extension, for powering device 100 as a whole.

Connected to processor IC 110 is storage 150 and memory 160, which can include volatile memory and/or non-volatile memory. Storage 150 is a permanent data storage device, which can be any type of available storage device capable of storing one or more application software (program code) and data. It is further appreciated that in one or more alternate embodiments, storage 150 can actually be remote storage and not an integral part of the device itself. Storage 150 can include random access memory and other types of non-volatile memory. Storage 150 maintains the executable modules for system firmware 152, as well as the modules of one or more applications that can be executed on device 100. System firmware 152 can include general device firmware 153 and other firmware that are associated with device 100 and which provides/performs or supports several of the functional features of the present disclosure, according to the described embodiments. For example, system firmware 152 is illustrated having included therein speech-to-text engine 154, automatic dual input activation utility 155, speech/audio input detection module 156, and I/O devices control firmware modules 158. It should be appreciated that the specific names of the modules of code that implement the specific functions described are not necessarily actual names applied to the modules of executable code, and the names provided are intended merely to provide a functional description of the operations performed by the specific module of executable firmware code.

Referring now to memory 160, during device operation, the executable code of firmware modules and/or from executable applications can be loaded into memory for execution by data processor 112. Specifically, memory 160 is illustrated as containing executable code of firmware 152 and executable code of example application 162, which includes an application (user) interface 163 that supports or incorporates a content capturing and presenting (CCP) interface 164. In at least the illustrated embodiment, application 162 can also include a tactile input module 165 and an audible speech input module 166 for displaying virtual input mechanisms that can be used to receive corresponding tactile and/or audible speech inputs.

In addition to the above executable code/program modules of application 162, memory 150 can include additional modules associated with either application 162 or system firmware 152. In the illustrative embodiment, these modules, including flashing microphone icon module 167 and virtual tactile input module 168, are presented within system firmware 152. However, it is appreciated that the functionality associated with one or both modules can be included within the program code of application 162, in alternate embodiments. Flashing microphone icon module 167 can be controlled by UI controller 116, which is in communication with a speech input (or voice) detection and receiving subsystem that consists of microphone 120 and audio controller 118. Virtual tactile input module 132 communicates with and/or is controlled by UI controller 116. The associated functionality and/or usage of each of the software modules will be described in greater detail within the descriptions which follow. In particular, the functionality associated with and/or provided by the UI controller and the user interface modules is described in greater details with the description of the remaining figures, beginning with FIG. 2.

Continuing with FIG. 1, as a part of a communication network 105, device 100 includes one or more communication components to support the wired and/or wireless communication aspects of the disclosure. As shown, communication mechanisms 170 includes wireless wide area network (WWAN) transceiver 172 with connected antenna 173 and which communicates with a radio access network (RAN) 182 of a cellular network 180. RAN 182 is generally represented as including a base station, depicted as an evolved base node ("eNodeB") 183 controlled by a radio network controller (RNC) 184 that transceives (i.e., transmits and receives communication signals) over a base station antenna 185. To reduce cluttering of the figure, only one connected antenna 173 is depicted. However, device 100 may contain more than one antenna, each antenna having one or more selected bandwidths of operation to support different modes of communication or for simultaneous communication in different communication technologies.

Alternatively or in addition to WWAN transceiver 172, device 100 can include a wireless local access network (WLAN) module 174 to communicate with wireless devices and network, accessible via a wireless access point 190. Alternatively or in addition, device 100 can include a wireless personal access network (WPAN) transceiver 178 to communicate with WPAN devices, depicted as a Bluetooth® headset 193. WPAN can include technologies such as IrDA, Wireless USB, Bluetooth®, Z-Wave, ZigBee, Body Area Network, and ANT+. Alternatively or in addition, device 100 can include a near field communication (NFC) transceiver module 179, such as can be utilized for exchanging files with another user device or a payment kiosk, for example.

As a device supporting wireless communication, device 100 can be one of, and be referred to as, a system, device, subscriber unit, subscriber station, mobile station (MS), mobile, mobile device, remote station, remote terminal, user terminal, terminal, communication device, user agent, cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem.

As further illustrated, device 100 can also include components for wired communication, such as modem 175 for communicating over a plain old telephone system (POTS) 188 and Ethernet module 177 for connecting to a local access network (LAN) 192. Collectively, these wireless and wired components provide communication mechanisms 194 by which device 100 can communicate with the network 105 and particularly with other user devices within the networks. As illustrated at the top of FIG. 1, communication network 105 can include a second user device 187 belonging to a second user 186. In the description which follows, second user 186 and/or his device 187, are referred to as another messaging participant, with the assumption being that the application being executed on the device 100 can be a messaging application (e.g., SMS or IM) that has a messaging interface for displaying and receiving content that can originate at the device 187 of second user 186.

Figure 2:
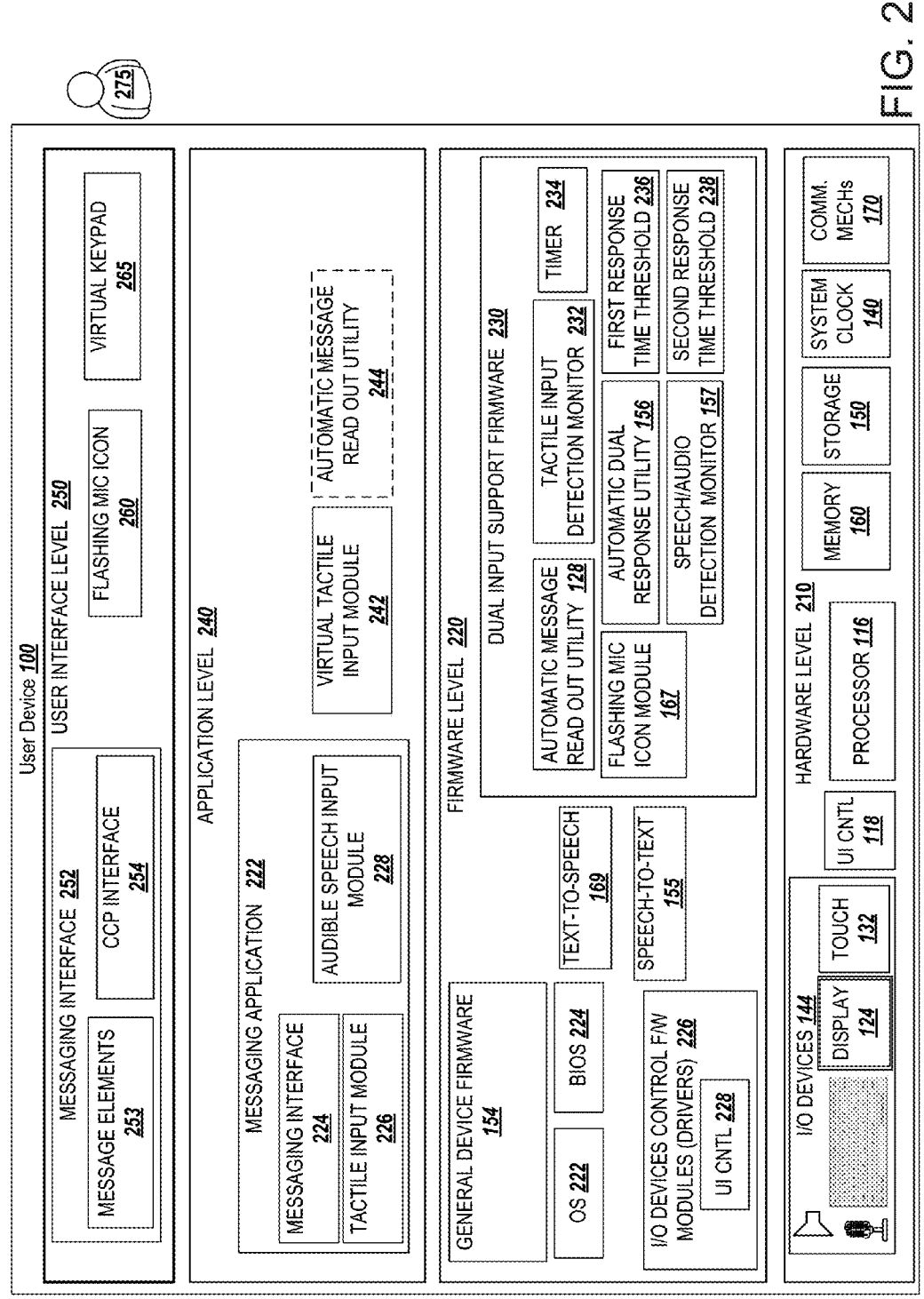
FIG. 2 illustrates a multi-level device view depicting functional hardware, firmware, and software components within specific levels that collectively enable automatic activation of dual input mechanisms within a messaging application environment provided on a user device, according to one or more embodiments.

Turning now to FIG. 2, there is illustrated a multi-level configuration separating out components within device 100. The multi-level configuration includes hardware level 210, firmware level 220, application level 240, and user interface level 250, extending from the bottom of the figure to the top of the figure. Many of the physical hardware, firmware and software components overlap with those shown in FIG. 1 and have been previously introduced. Reference is made to these components only as need to complete the description of FIG. 2. Similar reference numerals are presented for those previously-introduced components. Beginning at the hardware level 210, the various components included therein have been previously introduced in the description of FIG. 1. Moving up to firmware level 220, there are illustrated several additional components in addition to the already-introduced components from FIG. 1. Thus, firmware level 220 includes operating system (OS) 222 and basic input output system (BIOS) 224. These components are common in the industry, particularly within general computer systems and smart devices that support execution of multiple applications. In addition to these primary firmware components and/or as a complement to BIOS 224, firmware level 220 includes I/O device control firmware/modules 226, which are often referred to in the industry as device drivers. In the illustrative embodiment, I/O device control firmware/modules 226 includes specific UI controller firmware 228 that supports certain of the user interface functions described herein. It is appreciated that the firmware (228) for UI controller 118 can be embedded or stored within UI controller itself, and can exist independent of the device firmware, in alternate embodiments. Firmware level 220 also includes dual input support firmware 230, comprising multiple executable modules, which collectively support and/or implement several of the various novel features of the disclosure. In addition to the previously introduced modules, dual input support firmware 230 also includes tactile input detection monitor 231, timer 232, first response time threshold 233, and second response time threshold 234.

First response time threshold 233 and second response time threshold 234 are pre-established time values that can, in one embodiment, be set and/or modified by a user of device, either at a device level and/or at a specific application level. It is appreciated that not every application that utilizes the functionality described herein would operate on a same wait time for detection of speech or other inputs. For example, a messaging application would perhaps require a shorter wait time for receipt of audible input than the wait time assigned to a word processing application. Thus, application-based setting of the specific wait times to utilize for the particular application can be provided, as one aspect of the disclosure.

In certain embodiments, dual input support firmware 230 can also include automatic message read out (AMRO) utility 235. As described in greater detail below, AMRO utility 235 enables automatic reading out of certain types of content displayed within the messaging interface 252 following activation or opening of the messaging interface 252 and/or opening of one or more included message elements 254. In one embodiment, the automated read-out occurs based on a set of one or more pre-established conditions. In the following description of the one or more example embodiments, AMRO utility 235 is presented as a module within the firmware 152 of device 100 and thus separate from and not included within application 162. However, embodiments are contemplated in which AMRO utility 235 is provided as an executable component within application code. Firmware level 220 also includes a text-to-speech engine 236, which can be included within dual input support firmware 230, in one embodiment.

According to the general aspects presented by the present disclosure, the combination of FIGS. 1 and 2 provides a device 100 that includes a plurality of input devices, including a speaker 122, a microphone 120 capable of capturing audible speech inputs, and at least one tactile input mechanism 130. The device includes: a display device 124 capable of displaying a plurality of user interfaces and control affordances; and a memory 160 comprising firmware 152 and at least one application 162 that generates a content capturing and presenting (CCP) interface 164 for receiving content that can be inputted via both speech-input and tactile-input. The device also includes a processor 112 that is communicatively coupled to the speaker 122, the microphone 120, the display device 124, the tactile input mechanism 130, and the memory 160, and which executes program code of the firmware 152 and the application 162 to activate the CCP interface 164. The device 100 also includes a user interface controller 118 communicatively connected with the plurality of input devices and the processor 112 and that detects activation of the CCP interface 164. Accordingly, during operation of the device to execute the application, the user interface controller 118, in response to detecting the activation of the CCP interface 164, triggers activation of both (i) the tactile input mechanism 130 for capturing tactile inputs and (ii) the microphone 120 for capturing audible speech inputs. The user interface controller 118 monitors for detection of one of (i) a tactile input, detected at the tactile input mechanism 130, which would require/involve use of the tactile input mechanism to input the content, and (ii) audible speech, captured via the microphone 120, which triggers use of the microphone 120 to input the content. Following, in response to detecting audible speech, the user interface controller 118: closes or de-activates the tactile input mechanism 130; captures the audible speech via the microphone 120; and presents content corresponding to the audible speech within the CCP interface 165.

In a general context, the above aspects of the disclosure can be applied to any number of applications that allow for user input of text-based content, where the content can also be inputted via speech input. Where the resulting content is intended to be alphanumeric text, such as with a word processing application, a speech-to-text engine is utilized to transcribe the received audible speech into text. The resulting text is then presented within the CCP interface 164 as the content. In embodiments where speech audio is an acceptable form of content, the audio file can be provided as the content. These latter embodiments apply to instances where the application is a messaging application that has received a speech-based message element that is or can be outputted on the device speaker 122.

Figure 5:
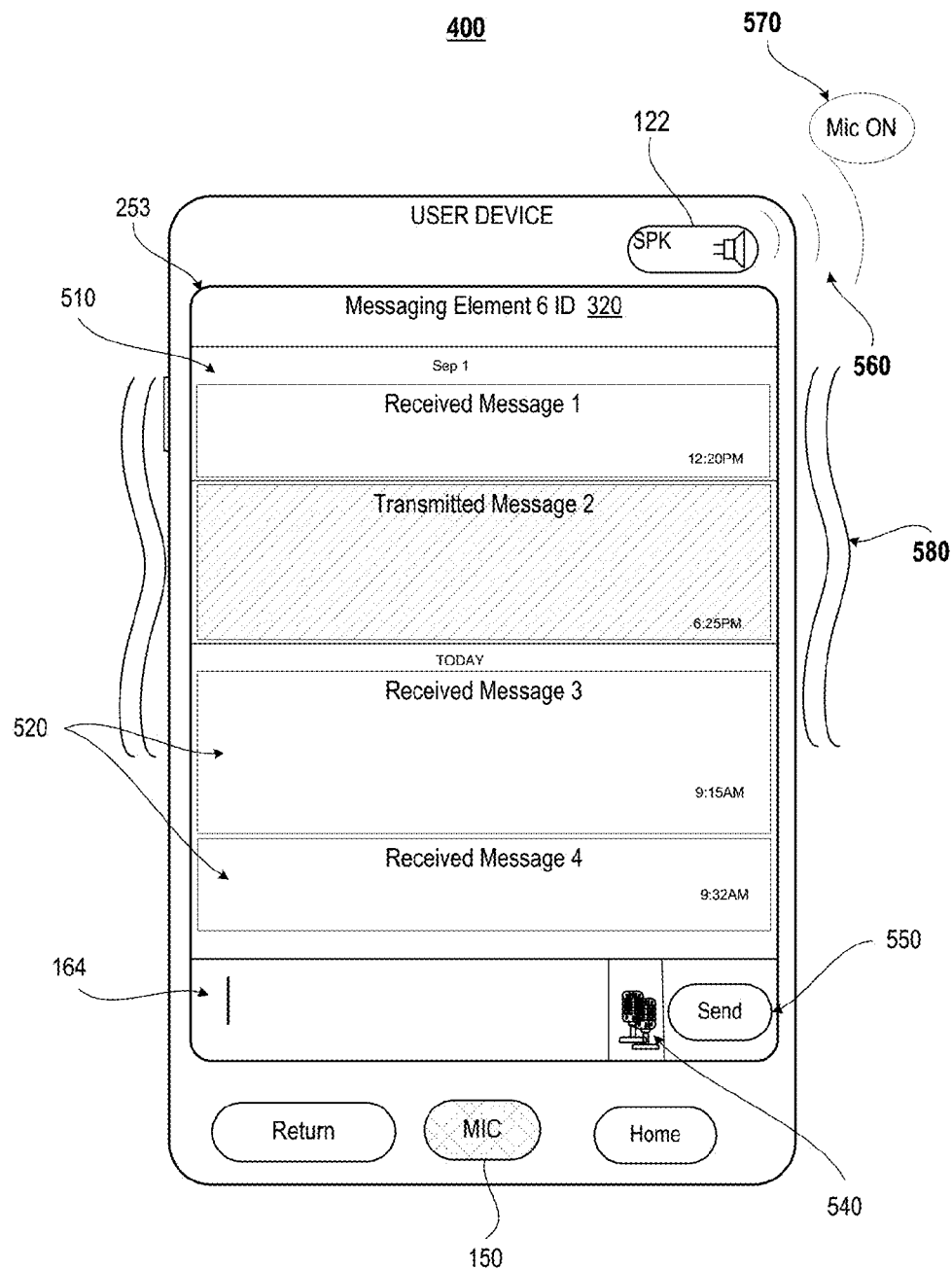
Figure 6:
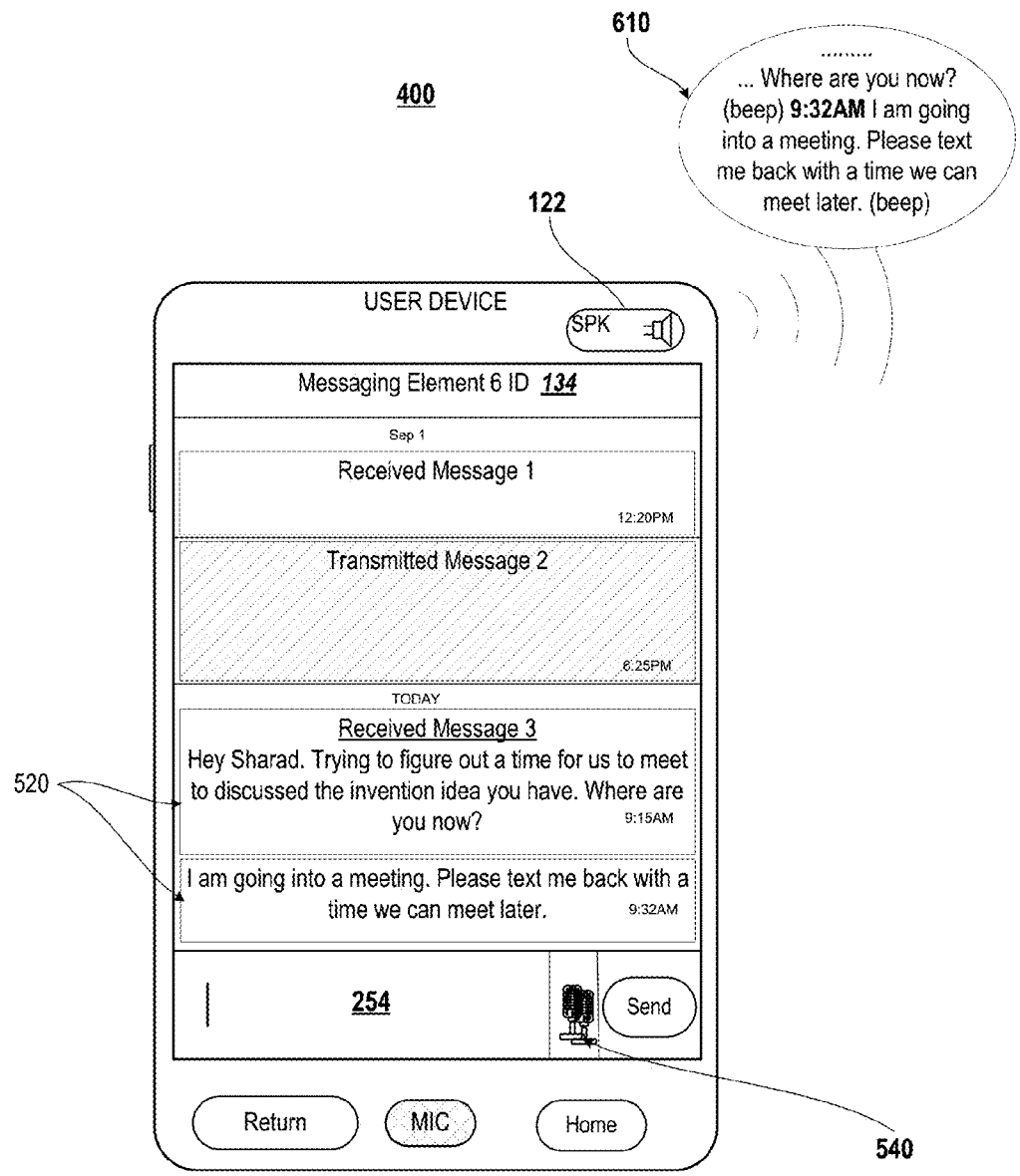

According to one or more embodiment, and as also illustrated by FIG. 6, contemporaneously with automatically enabling the microphone 120, the user interface controller 118 provides user-detectable indication/s that the microphone 120 is in active listening mode, by performing at least one of (i) displaying an animated icon of the microphone 120, outputting an audible tone, (iii) performing a speech readout, and (iv) vibrating the device. Further aspects of this implementation are described with reference to FIGS. 4-8.

Figure 3:
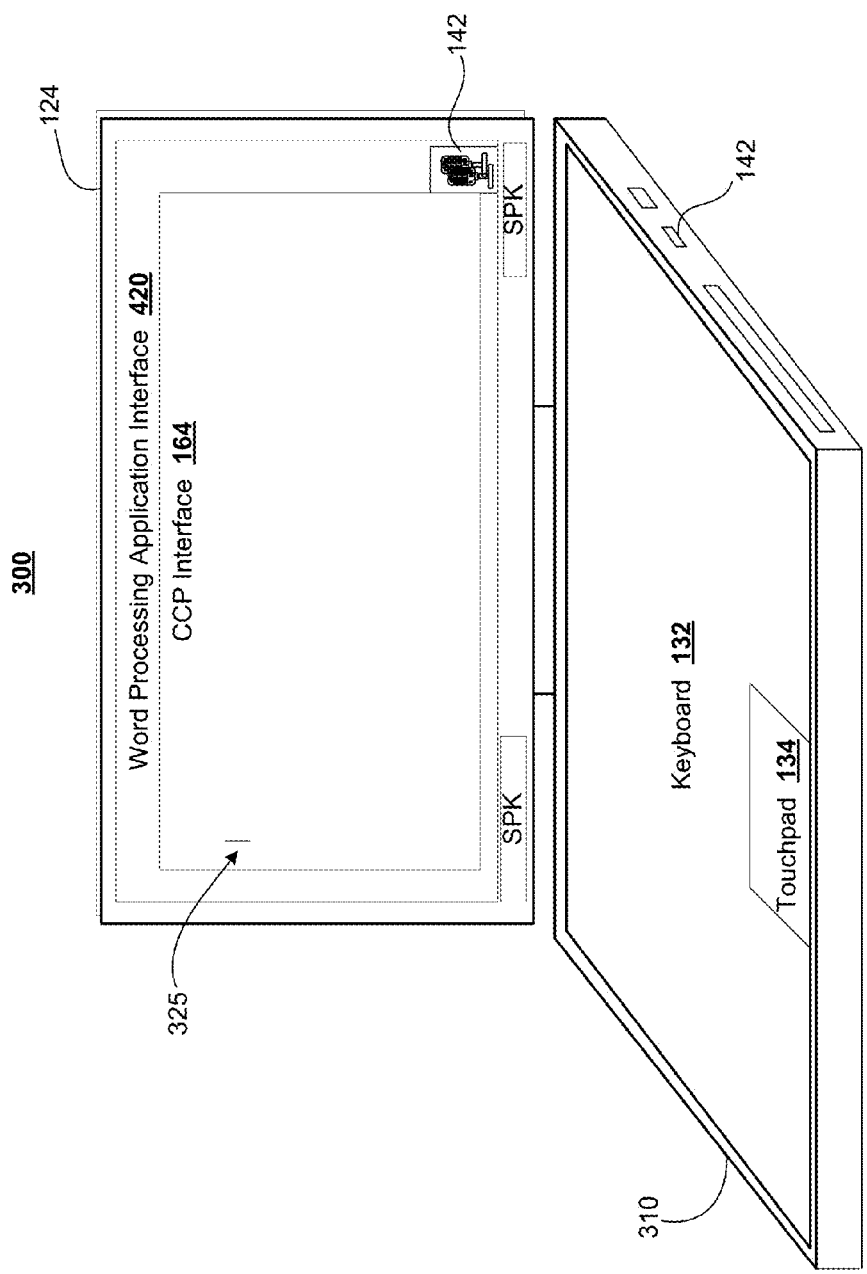
FIG. 3 is a block diagram illustration of an example laptop providing a word processing application interface and which supports the automatic activation of audible speech input on opening of the application, in accordance with one or more embodiments.

FIG. 3 illustrates one embodiment of the general features of the disclosure applied to a word processing application on a computer device. Computer device 300 includes substantially all of the components illustrated in FIG. 1 and the hardware and firmware levels of FIG. 2. Computer device 300 is shown as a laptop having a base 310 connected to a display 320. Base 310 includes keyboard 132 and touch pad 134. A microphone and speaker are embedded within base 310 and/or display 320, hidden behind the exterior casing of computer 300. Display 320 provides a user interface, which includes a CCP interface 164 of a word processing application. Also presented within the user interface is a blinking microphone icon 325, indicating that the microphone is in active listening mode. The microphone can be automatically triggered for presentation on the display contemporaneously with the activation of the application and/or the opening of the CCP interface 164 on display 320. Audible notification or tactile notification (via vibration of the device, for example) of the activation of the microphone can also be provided in alternate embodiments. Following opening of the CCP interface 164, the microphone is automatically activated, and the user can immediately begin dictating speech audio, which is captured, converted to text, which text is then presented within the CCP interface 164.

Returning now to FIG. 2, in one specific implementation of the disclosure, embodiments are presented in which the application is a messaging application, such as an SMS or IM application, that both receives messages from a message sender and enables a user of device 100 to reply to the messages and/or to generate new messages using either or both tactile input and speech input. As provided within FIG. 2, device 100 further includes application level 240, which is illustrated having messaging application 242, as a specific embodiment of application 162. Messaging application 242 includes a messaging interface, a tactile input module 246, such as a virtual keyboard that includes a microphone icon thereon. Messaging application 222 can, in one or more embodiments, include the mechanism for converting audible speech input 228 encoded within the application itself. Application level also includes virtual tactile input module 246 and can optionally include automatic message read out utility 248.

Device 100 also includes user interface level 250, which provides a list of visible components that are presented on the display 124 of the device 100 based on actual execution of code within the application level 240. User interface level 250 is described in conjunction with FIGS. 4-9, which illustrate an example user device 400, such as but not limited to a smart phone, having a touch screen user interface 410 within which is displayed the various components that are introduced in user interface level 250 (FIG. 2). As illustratively provided within FIGS. 4, 5 and 6, within user interface level 250 are messaging interface 252, which includes message elements 253 and input receiving area, CCP interface 254. User interface level 250 also includes flashing microphone icon 260 and virtual keypad 265 that are both selectively displayed based on one or more events, as described herein.

Figure 4:
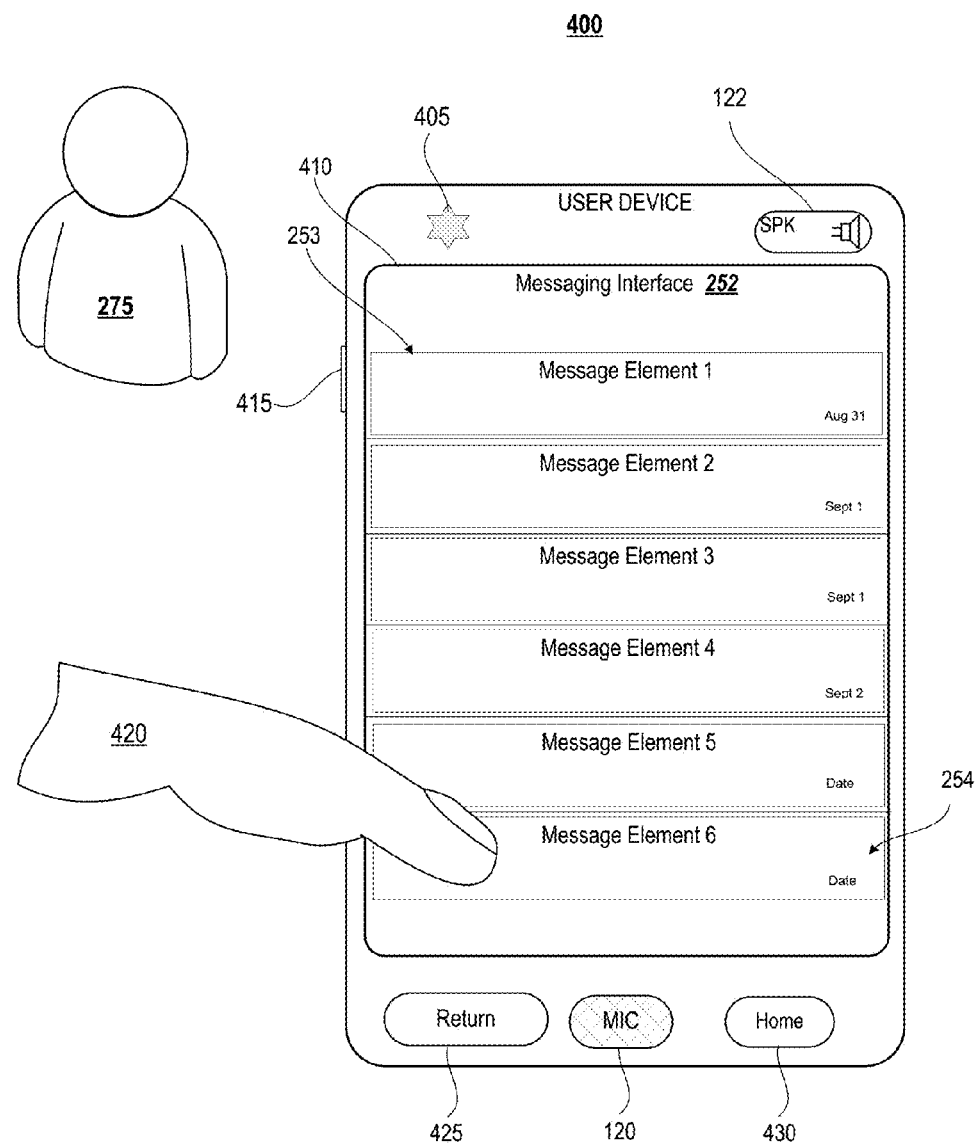
FIGS. 4-9 provide different temporal views of a messaging interface on an example handheld user device, such as a mobile phone, illustrating the automatic activation of the dual inputs, including a tactile user interface and virtual microphone, as well as other associated functionality within the messaging interface, in accordance with several embodiments.

Referring to FIG. 4, there is illustrated example user device 400 with messaging interface 252 opened and displayed on device 400. Device 400 is configured with the various components from FIGS. 1 and 2, of which speaker 122 and microphone 120 are illustrated. Device can also include other external control affordances, such as volume control 415, and also includes virtual affordances, such as settings icon 405, return icon 425, and home icon 430. In one or more embodiments, a device setting includes a default reply setting that supports a text-based reply to the received message and is configurable to a second reply setting that enables user selection of the microphone for speech-based reply when responding to the received message, based on detection of user initiation of audible speech following audible outputting of the received message. Also, the device setting can include a setting that supports reading out of received messages. Access is provided to the device settings interface (not shown) via selection of the settings icon 430, in one embodiment or from a menu option, in an alternate embodiment. From that settings interface, a specific firmware configuration can be selected by the user that modifies the default configuration from a text-only input to a dual input configuration, for legacy devices, or vice versa, for newer devices that are pre-configured to provide activation of the dual input methods on instantiation of the application or opening of the associated messaging interface.

The opening of messaging interface 252 can be triggered by user selection of an icon or executable file corresponding to messaging application 222. In response to that selection, processor 116 executes the relevant application code along with code of supporting device firmware to enable messaging application 222 and to display messaging interface 252 on the device 400. Messaging interface 252 opens with a presentation of the most recently active message elements 254 on display screen 410. Each message element 254 includes an identifier, which may include the name and/or phone number and/or email address and/or nickname of the user that created the particular message element. For simplicity, the identifiers are presented simply as the sequential number of the particular message element within the messaging interface 252. FIG. 4 also illustrates a user 275 and a finger 420 associated with that user 275 that is utilized as a tactile message selector. It is appreciated that other types of tactile message selectors are possible to provide tactile input to the messaging interface 252 of device 400. It is further appreciated that in some embodiments, the opening of the messaging interface 252 can also trigger the activation of the microphone 120 to allow for voice-activated control of the selection of a specific message to open. In the provided embodiment, user 420 manually selects message element 6, which selection causes the opening of a hierarchical/historical view of message element 6, as shown in FIG. 5.

FIG. 5 illustrates one aspect of the embodiment in which CCP interface 164 is a part of messaging interface 252. Contemporaneously with the opening of message element 6, UI controller 118 and/or processor 112 activates tactile input mechanism and UI controller and/or processor 112 and/or audio controller 116 activates microphone 120. The messaging element is presented with a CCP interface 164 for displaying any received input and a send icon 550 that can be manually selected to transmit the received input within CCP interface 164 as a reply message in the message sequence. In one embodiment, when a new message is being created (i.e., the input is not being entered for an already existing messaging element), the messaging interface 252 will include and display an addressee/recipient section for inputting the identifier of the recipient of the received input message. In the illustrative embodiment, during execution of messaging application, the user interface controller 118: detects activation of a message element 254 within a messaging application that supports a messaging respondent (user 320) replying to a received message 420 via both speech-input and tactile-input.

Messaging element 6 410 includes therein three received messages, messages 1, 3 and 4, and one transmitted message, message 2. The two most recent received messages are indicated as having been received "today" and, for the purpose of the illustrative embodiment, an assumption is made that both message 3 and message 4 have not yet been individually accessed and/or read by the device or device user.

According to one embodiment, contemporaneously with automatically enabling the microphone, the user interface controller 118 can provide user-detectable indication/s that the microphone is in active listening mode, by at least one of (i) displaying an animated icon 540 of the microphone 120 (as illustrated by FIG. 5), (ii) outputting an audible tone 560 (FIG. 5), (iii) performing a speech readout 570 (FIG. 5), and (iv) vibrating the device (580, FIG. 5).

As presented above in the description of FIG. 1, the tactile input mechanism 130 can include at least one of a physical keyboard, a virtual keyboard, and a virtual swipe box. Also, the tactile input mechanism 130 provides text content in response to user manipulation of an input affordance that is associated with one of the device and the application.

Figure 9:
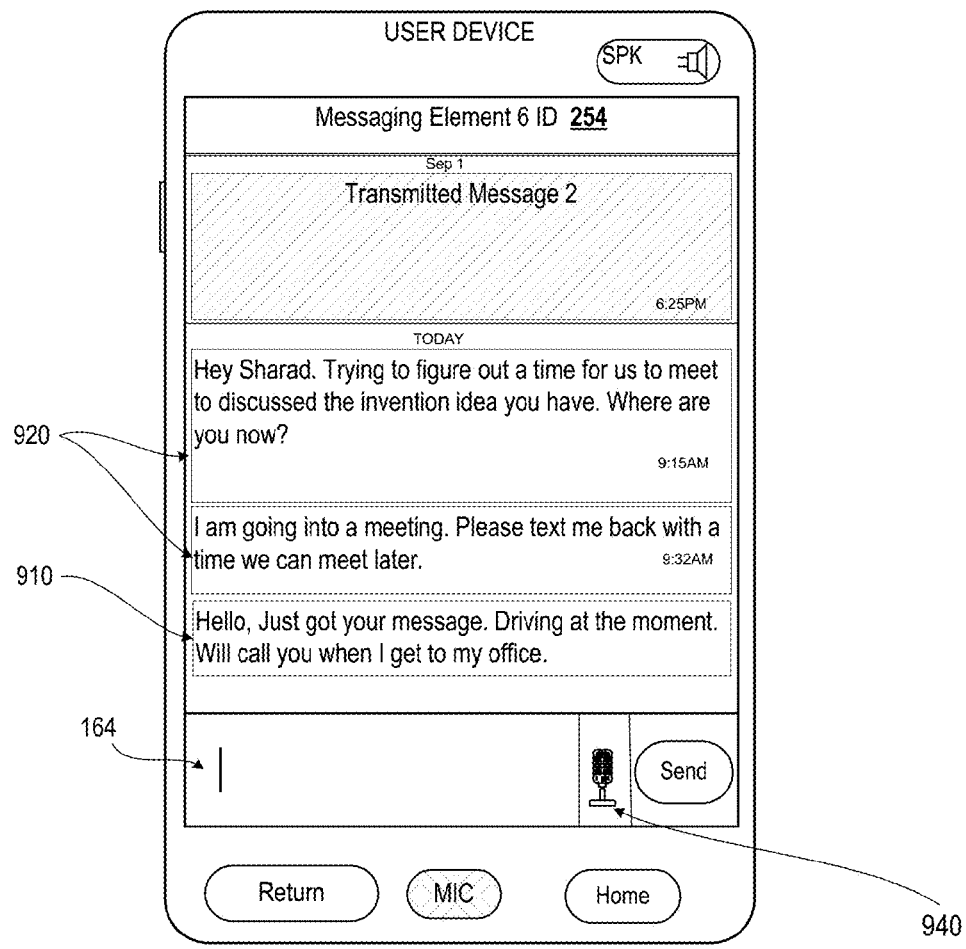

According to one embodiment, when the tactile input mechanism is a virtual device, the user interface controller 118 simultaneously opens and displays both an icon 540 representing the microphone 120 and a virtual tactile input device (TID) 720. The processor 112 sets a timer to track an elapsed time after the simultaneous opening of the tactile input mechanism (720) and the microphone 120. Following, in response to the expiration of the timer without receiving any input, the user interface controller 118 closes both the tactile input mechanism (720) and the microphone 120. Alternatively, in response to detecting tactile manipulation of the virtual input device 720 prior to expiration of the time, the user interface controller 118 removes the microphone icon 540 from the display and closes the microphone input (FIG. 9). Further, in response to detecting audible speech input prior to expiration of the timer, user interface controller removes the virtual input device 720 from the display.

According to one aspect of the disclosure, the UI controller 118 identifies whether a last message (received message 4) within the message element 254 is a received message. Within the context of the described embodiments, a received message is a message that was created by another messaging participant (e.g., remote user 186), different from the messaging respondent (320), and received within or associated with the messaging element 254 that corresponds to the messaging respondent.

According to one aspect, in identifying whether a last message within the message element is a received message, the processor 112 identifies a hierarchy of messages within the message element, which hierarchy lists an order and time sequence of entry of each message associated with the message element, including any messages generated at a respondent side of the message exchange. And, the processor 112 identifies as the received message 520 all messages in the hierarchy that were received subsequent to a most recent message generated by the messaging respondent within the message element.

Additionally, in one or more embodiments related to the messaging interface, in response to the last message within the message element being a received message 520, the user interface controller: identifies whether the received message has been previously accessed; and in response to the received message not having been previously accessed: if the received message is in text form, forwards content of the received message to a text-to-speech engine to covert the text content to audible speech; audibly outputs the content of the received message (610, FIG. 6); and performs the automatic enabling of the tactile input mechanism and the microphone. Thereby, the received message 520 is audibly outputted (610, FIG. 6) contemporaneously with the automatically enabling. As one extension of this embodiment, the user interface controller 118 further monitors for detection of an input from among a tactile input and an audible speech input during the audible outputting of the received message. The UI controller 118 pauses the audibly outputting of the received message in response to detecting the input.

Further, as illustrated by FIG. 6, in response to multiple received messages not having been previously accessed, processor 112 and/or audio controller initiates audible outputting 610 of the multiple received messages 520 in sequential order from a first received to a last received message. Thus, the audible outputting 610 of the content of the received message comprises reading out all messages identified as the received message 520 in time order of receipt of the messages. The audible outputting of the received message/s is illustrated using sound bubble 610 within which the content of the received messages 520 are displayed (indicating the messages being audibly read out).

Figure 8:
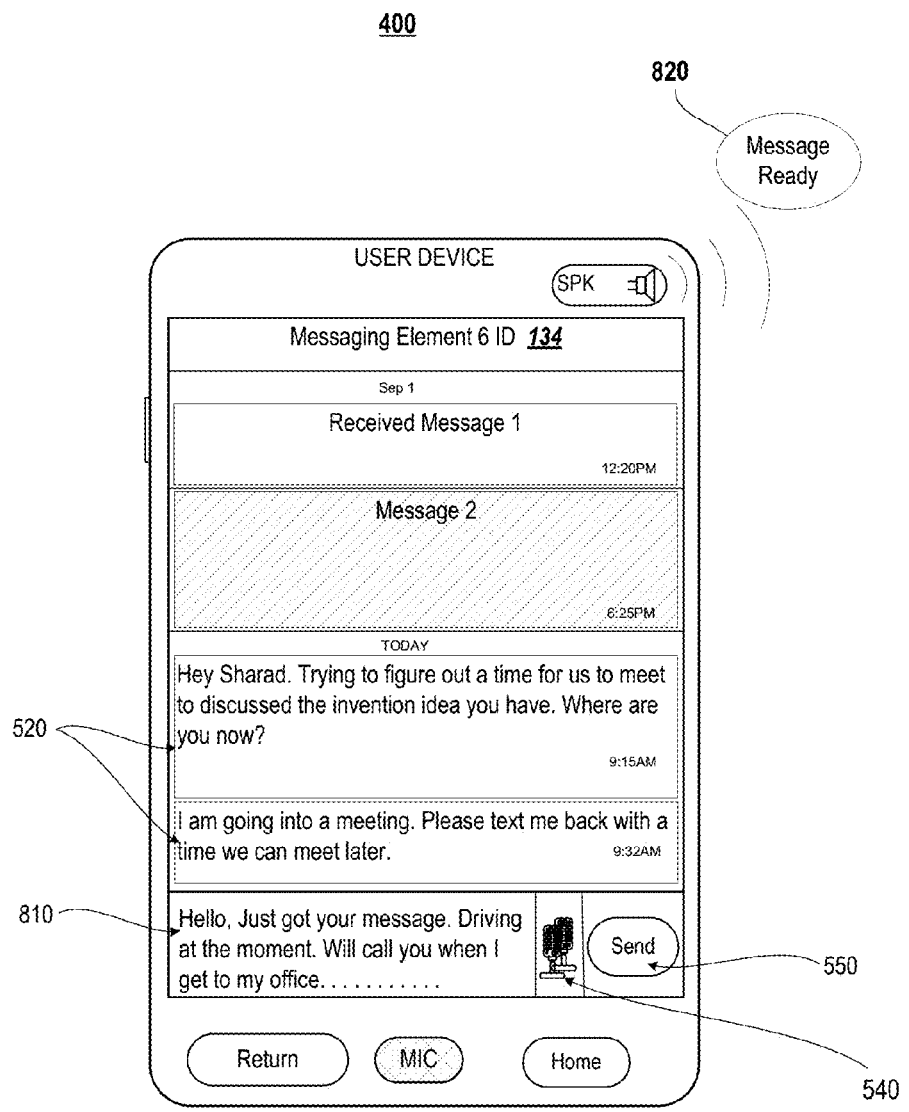

Referring to FIGS. 8 and 9, there are illustrated another view of device 400 with audio input received and displayed as corresponding text within the CCP interface 164. In this example, the audio content is transcribed to text 810, which is mirrored or presented within the CCP interface 164 prior to being transmitted from device 400 to the addressee of the message. The disclosure allows for pauses during input of messages to allow the speaker to formulate an entire message before the message content is forwarded. Thus, in response to detecting audible speech as the input method, the user interface controller 118 monitors for a pause in detected audible speech input, and the processor 112 tracks an elapsed time since a last detected audible speech and compares the elapsed time to an end-of-speech input threshold value. In response to detecting additional audible speech input before the elapsed time exceeds the threshold value, the processor adds content corresponding to the detected additional audible speech input to previously captured content. Following, the user interface controller 118 and/or the processor 112 automatically forwards content corresponding to the captured audible speech as a reply message to the received message. Accordingly, the audible speech is audibly captured and the content (810) corresponding to the audible speech is automatically forwarded as the reply message 910 (FIG. 9), without requiring tactile manipulation of the device. As shown by FIG. 9, the content of the reply message 910 is moved from CCP interface 164 to existing message interface 920, displacing the previous last message 520 in the message element to become the last current message.

Also, in one embodiment, when the CCP interface 164 is a messaging interface that captures content for transmission as a message, in response to the elapsed time exceeding the threshold value: the processor sets a second timer and visually, audible (e.g., sending message signal 820) or otherwise indicates that the content of the received audible speech is about to be transmitted to another messaging participant. The user interface controller monitors for detection of one of an audio input and a tactile input prior to expiration of the second timer, and in response to not detecting any further input prior to expiration of the second timer, the processor automatically forwards the content (810) of the detected speech presented within the reply message 810 to the other messaging participant. However, in response to detecting a tactile input: the user interface controller 116 automatically opens the tactile input mechanism and CCP interface (the text input area of the message) having the content of the detected audible speech displayed therein for editing and appending thereto. The processor 112 then forwards a final content of the reply message 810 only when a send message option 550 is selected within the messaging interface.

Figure 10:
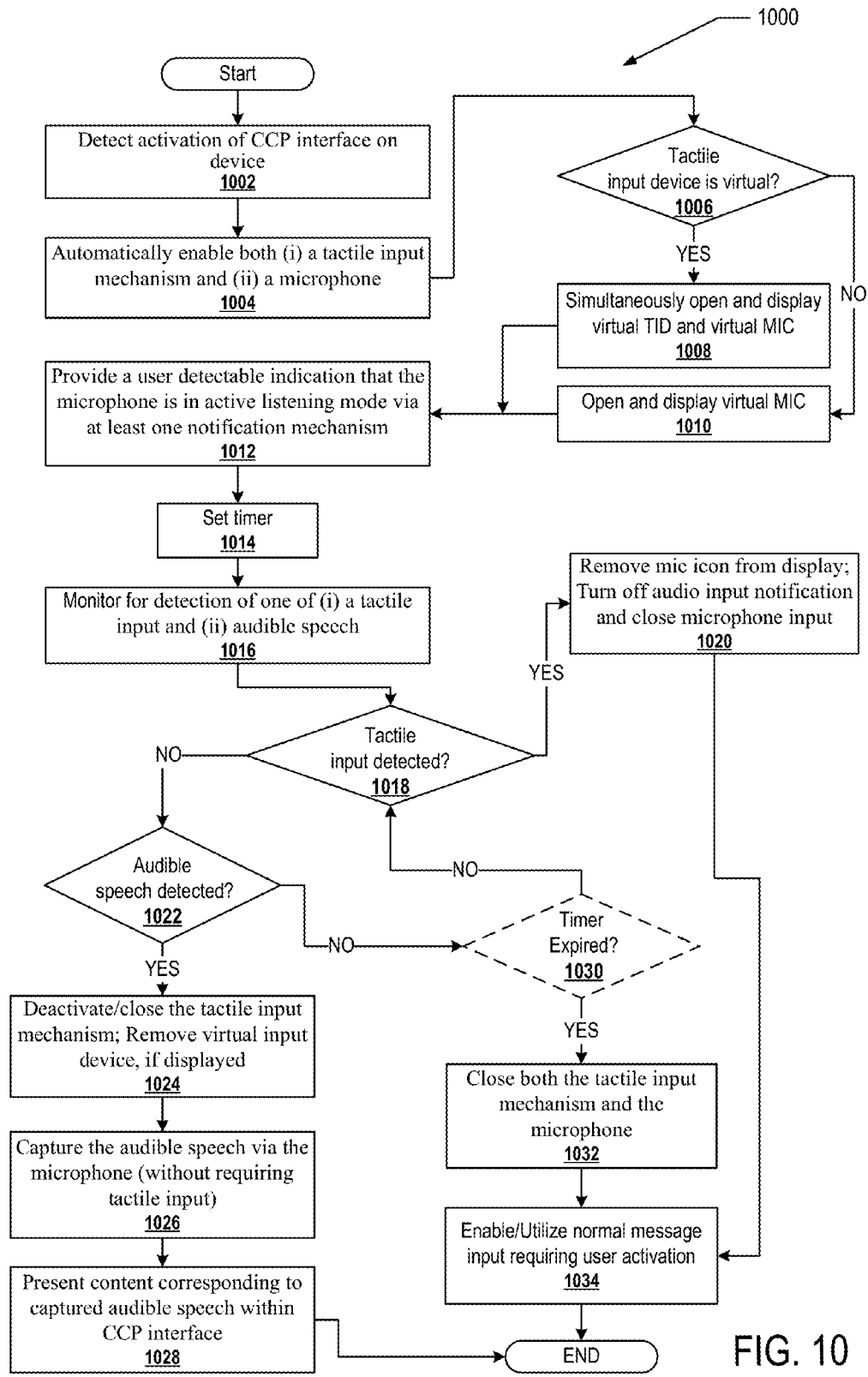
FIG. 10 is a flow chart illustrating an example method of automatically activating and controlling both tactile input and speech input on a device and responding to detection of a specific one of the inputs, in accordance with one or more embodiments.
Figure 11:
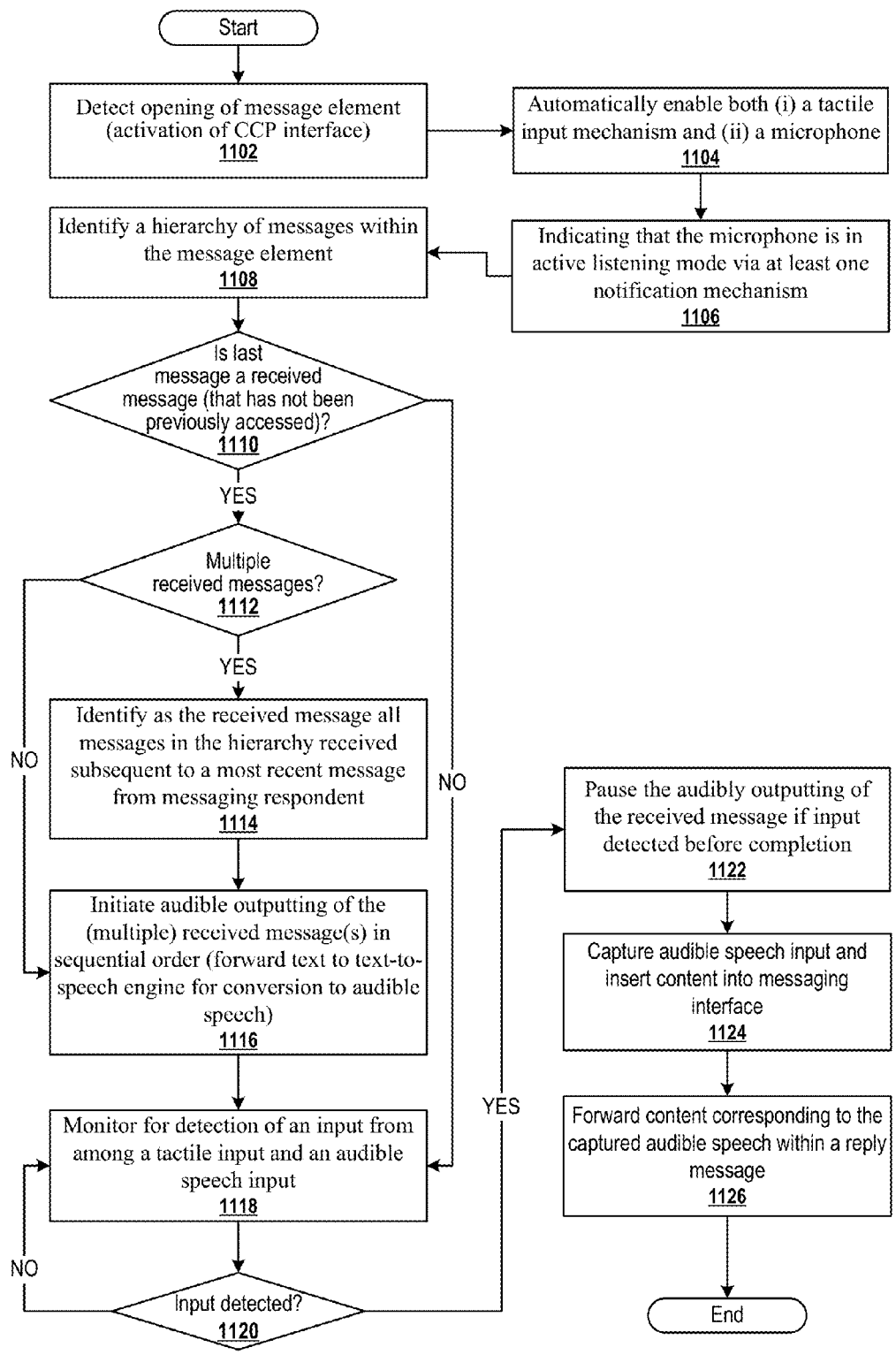
FIG. 11 is a flow chart illustrating an example method of implementing the automatic activation of dual input mechanisms within a device and several additional features associated therewith within a messaging application, in accordance with one or more embodiments.
Figure 12:
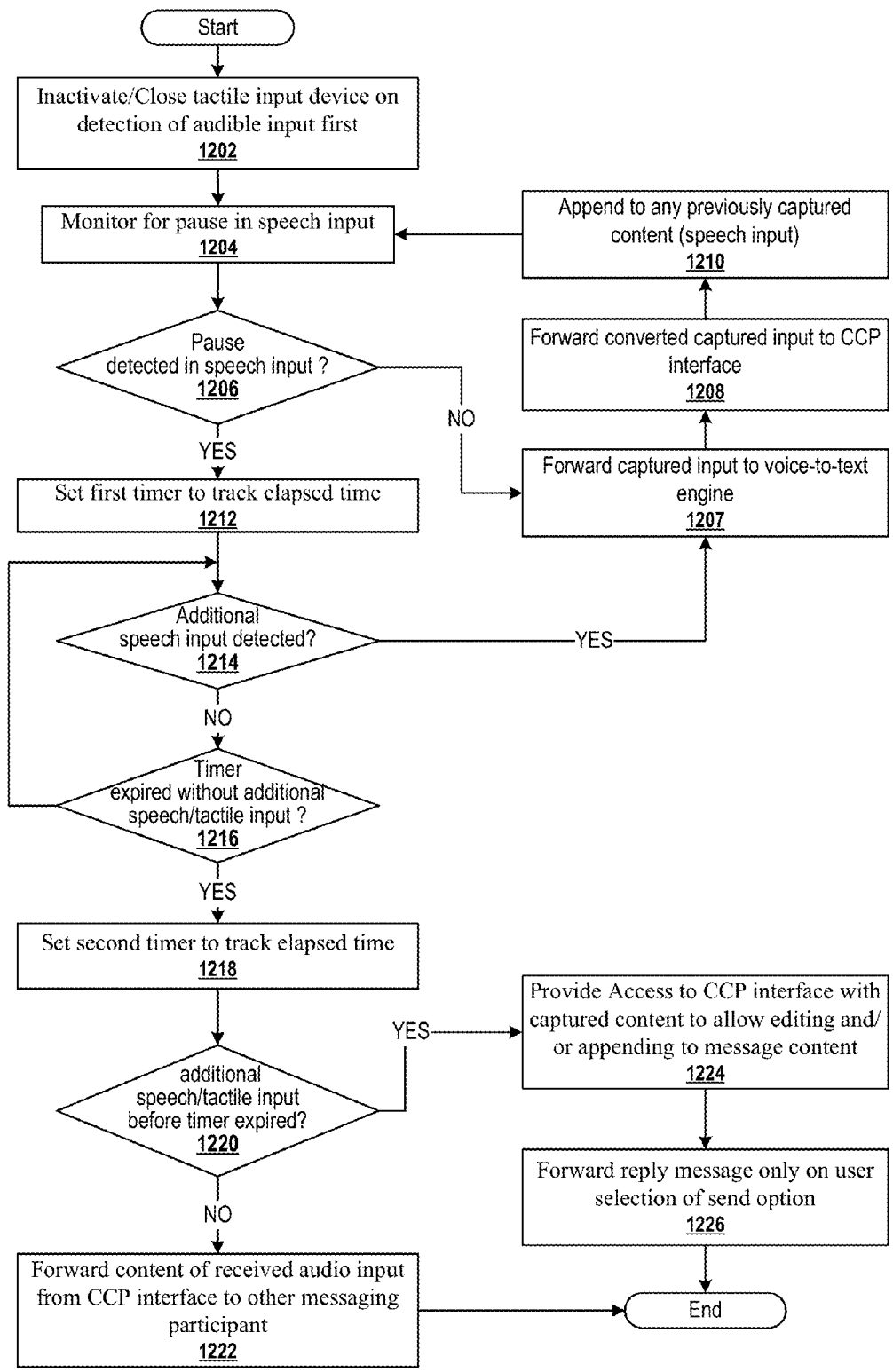
FIG. 12 is a flow chart of an example method of automatically creating a reply message from audible input and automatically forwarding that reply message, based on tracking the elapsed time from a last received input, in accordance with one or more embodiments.

FIGS. 10-12 are flow charts which illustrate the methods by which various aspects of the disclosure can be implemented, utilizing functional components in one or more of the devices presented in FIGS. 1-9. Specifically, FIG. 10 illustrates an example method of automatically activating and controlling both tactile input and speech input on a device and responding to detection of a specific one of the inputs, in accordance with one or more embodiments. FIG. 11 illustrates an example method of implementing the automatic activation of dual input mechanisms within a device and several additional features associated therewith within a messaging application, in accordance with one or more embodiments. And FIG. 12 illustrates an example method of determining when to automatically create a reply message from audible input and when to forward that reply message, based on tracking the elapsed time from a last received input, in accordance with one or more embodiments.

The description of method 1000 is provided with general reference to the specific components illustrated within the preceding FIGS. 1 and 3. The descriptions of methods 1100 and 1200 are provided with general reference to the specific components illustrated within the preceding FIGS. 1, 2, and 4-9. Generally, methods 1000, 1100 and 1200 are described as being implemented via user interface controller 118 and/or execution by processor 112 of code provided by application and/or firmware within device 100, 300, or 400. It is however appreciated that certain aspects of the described methods may be implemented via other processing devices and/or device components and/or execution of other code.

Figure 7:
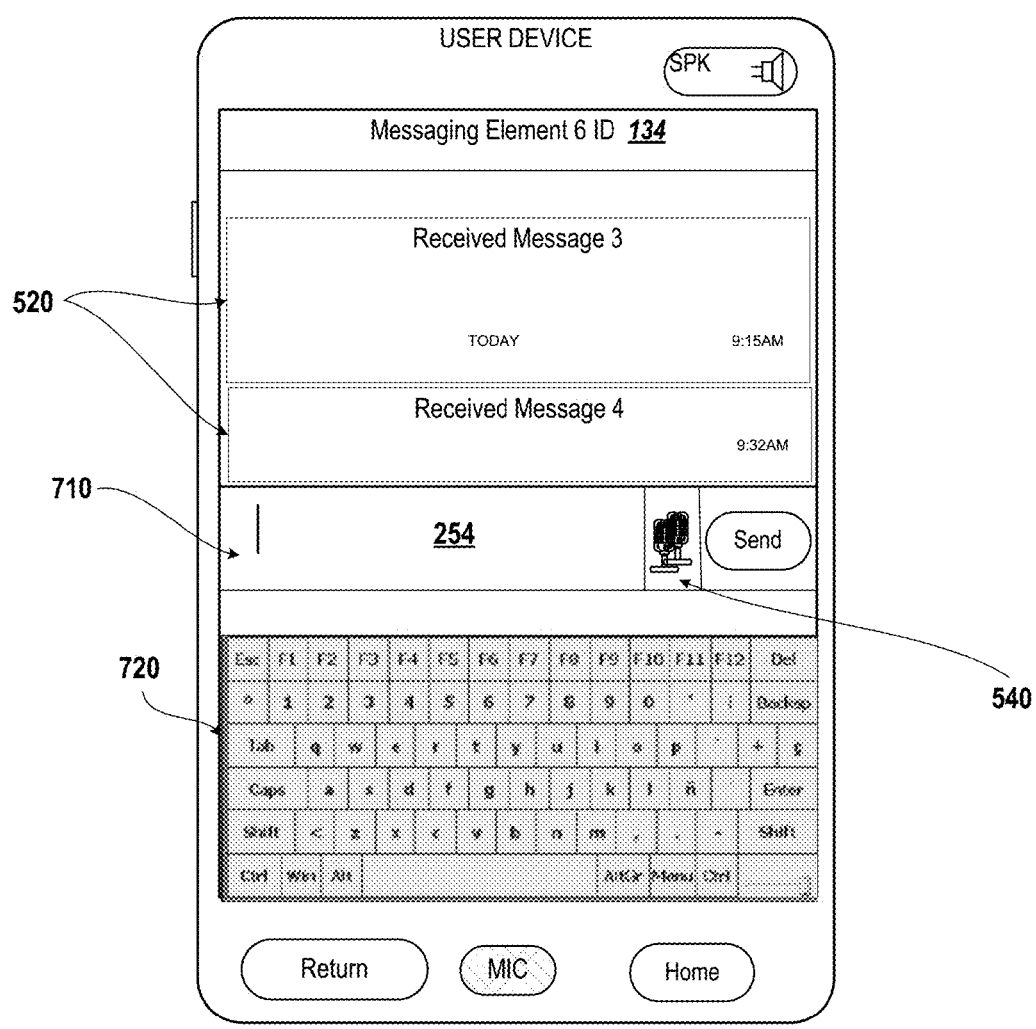

Referring now to FIG. 10, there is presented a method by which dual input activation is provided for general application processing, in accordance with one embodiment. Method 1000 begins at start block and proceeds to block 1002 at which method 1000 includes detecting activation, on a device, of a content capturing and presenting (CCP) interface for receiving content that can be inputted via both speech-input and tactile-input. Method 1000 includes, in response to the activation, automatically enabling both (i) a tactile input mechanism for capturing tactile inputs and (ii) a microphone for capturing audible speech inputs (block 1004). At decision block 1006, method includes identifying whether the tactile input mechanism is a virtual device. When the tactile input mechanism is a virtual device, method 100 then includes simultaneously opening and displaying both an icon representing the microphone and a virtual tactile input device (TID) (block 1008). FIG. 7 illustrates this opening of both tactile and audible virtual input mechanisms on the display of the device. Otherwise, method 1000 provides opening and displaying the virtual microphone (block 1010). FIG. 5, presented as an illustration of this concept, shows that just a virtual microphone is activated on the device, where there is no virtual tactile input device. Method 1000 then includes providing user-detectable indication that the microphone is in active listening mode via at least one method of notification (block 1012). As illustrated within FIG. 5, the user detectable indication (notification) can include at least one of (i) displaying an animated icon of the microphone, outputting an audible tone, (iii) performing a speech readout, and (iv) vibrating the device.

With the microphone automatically activated, method 1000 includes the processor setting a timer to track an elapsed time after the simultaneous activation and/or opening of the tactile input mechanism and the microphone (block 1014). Method further includes monitoring for detection of one of (i) a tactile input, which involves use of the tactile input mechanism to input the content and (ii) audible speech, which triggers use of the microphone to input the content (block 1016). The user interface controller then determines, at block 1018, whether use of a tactile input is detected, and in response to detecting tactile manipulation of the tactile input device prior to expiration of the timer, method 1000 includes removing the microphone icon from the display, turning off the audible input notification, and closing or de-activating the microphone input (block 1020).

Further, in response to detecting audible speech input prior to expiration of the timer, as determined at decision block 1022, method 100 includes deactivation and/or closing the tactile input mechanism and removing (where present) the virtual input device from the display (block 1024). Method 1000 also includes capturing the audible speech via the microphone ((block 1026) and presenting content corresponding to the audible speech within the CCP interface (block 1028). Returning to decision block 1022, when no speech input is detected, the timer is checked (block 1030) to determine whether the elapsed time since the opening of the dual input mechanisms exceeds a preset threshold. The timer continues to track the elapsed time, and a periodic check is made of the elapse time against the time threshold (block 1030). In response to the time expiring without detecting any tactile or audible speech input, method 1000 includes closing or de-activating both the tactile input mechanism and the microphone (block 1032). Subsequently, method 1000 includes enabling normal tactile input, which requires tactile user selection of audible input, if the user desires to use audible input (block 1034). Method 1000 then terminates at end block.

Referring now to FIG. 11, there is provided a method by which dual input activation is triggered for a messaging application, in accordance with one embodiment. Method 1100 begins at start block and proceeds to block 1102 at which method 1100 includes detecting opening of a message element within a messaging application. The messaging application supports a messaging respondent replying to a received message via one or both speech-input and tactile-input. In response to opening of the messaging element, method 1100 includes automatically enabling both a tactile input mechanism and a microphone 1104 (block 1104) and providing an indication, via at least one notification mechanism, that the microphone is in active listening mode (block 1106). Following opening of the message element, method 1100 includes identifying a hierarchy of messages within the message element (block 1108). As provided herein, the hierarchy presents an order list in time sequence of entry of each message associated with the message element, including any messages generated at a respondent side of the message exchange. Method 1100 then includes identifying whether a last message within the message element hierarchy is a received message (block 1110). As provided herein, a received message is a message that was created by another messaging participant, typically different from the messaging respondent, and received within the messaging element tagged with the identifier of that other messaging participant. When the last message is a received message, method further includes determining at decision block 1112 whether there are multiple received messages in sequence. In response to there being multiple received messages in sequence, method 1100 includes identifying as the received message all messages in the hierarchy that were received subsequent to a most recent message generated by the messaging respondent within the message element (block 1114).

Notably, if the received message is in text form, method 1100 can include forwarding content of the received message to a text-to-speech engine to covert the text content to audible speech. Then, the method 1100 includes audibly outputting the content of the received message (block 1116). In one embodiment, method optionally also includes identifying whether the received message has been previously accessed, and performing the audibly outputting only in response to the received message not having been previously accessed. Also, in response to multiple received messages not having been previously accessed, method 1100 can include initiating audible outputting of the multiple received messages in sequential order from a first received message to a last received message. Thus, the audible outputting of the content of the received message comprises reading out all messages identified as the received message in time order of receipt of the messages. Also, the method can include audibly outputting the received message contemporaneously with the automatically activating or enabling of the tactile input mechanism and the microphone or outputting the received message prior to the activation of the dual input mechanisms.

At block 1118, method includes monitoring for detection of an input from among a tactile input and an audible speech input during the audible outputting of the received message. Method 1100 further includes determining at block 1120 if an input is detected. When no input is detected, method iterates to block 1118 and continues to monitor for an input. In response to detecting an input before completion of the audible output, method 1100 includes pausing the audibly outputting of the received message (block 1122). Method 1100 then includes capturing audible speech input and inserting the corresponding content (from the captured speech input) into the messaging interface (block 1124). This process can involve transcribing the audible speech input by forwarding the captured speech input to a speech-to-text engine. In one embodiment that supports transmission of the actual audible speech content, the captured speech is package in an audio file for transmission. Method 1100 then includes, in response to detecting audible speech as the input method, automatically forwarding content corresponding to the captured audible speech as a reply message to the received message (block 1126). Accordingly, the audible speech is audibly captured and the content corresponding to the audible speech is automatically forwarded as the reply message, without requiring any tactile manipulation of the device.

Referring now to FIG. 12, there is provided a method whereby specific timing is provided to support use of audible input following dual input activation for an application, in accordance with one embodiment. Method 1200 begins at start block and proceeds to block 1202 at which method 1200 includes closing the tactile input device on detection of the audible input before a tactile input and prior to expiration of the timer. Method 1200 then includes monitoring for a pause in detected audible speech input (block 1204) and determining at block 1206 if that pause is detected. In one embodiment, method 1200 includes forwarding the detected audible speech to a speech-to-text engine for conversion to corresponding text (block 1207), providing the corresponding text within a text box displayed in the CCP interface (block 1208), and appending the recently captured content to any previously captured content that is present within the CCP interface (block 1210). In response to detecting a pause in the speech input, method 1200 includes setting a first timer to track elapse time since a last detected audible speech (block 1212). Method 1200 also includes determining, at block 1214, if additional speech input is detected and whether (at block 1216) the timer has expired without receiving any additional speech input. According to one embodiment, this time check involves comparing the elapsed time to a pre-established end-of-speech input threshold time value. When the first timer expires without receiving additional input, the automatic capture of audible speech input is halted at the device, and the method 1200 transitions to a message sending mode. Method 1200 further includes, setting a second timer to track elapsed time since the end of speech input (block 1218), and then checking at block 1220 whether the second timer has expired without there being any addition input. In response to not detecting any further input prior to expiration of the second timer, method 1200 includes automatically forwarding the content of the detected speech presented within the CCP interface to the other messaging participant. However, in response to detecting a tactile input prior to expiration of the second timer, method 1200 includes automatically opening the tactile input mechanism and the CCP interface in an editing mode to present the captured content from the detected audible speech input (block 1224). The CCP interface is presented in the editing mode (i.e., a cursor provided within the interface to allow manual editing therein) to allow the user to edit and/or append more content to the audibly captured message content. The use of a tactile input mechanism to enter content or access the CCP interface terminate the automatic forwarding option, and method 1200 then includes forwarding the reply message content only when the user selects the send option (block 1226). Method then terminates at end block.

In the above described flow chart, one or more of the methods may be embodied in a computer readable medium containing computer readable code such that a series of functional processes are performed when the computer readable code is executed on a computing device. In each of the flow charts of FIGS. 10, 11, and 12 presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described herein with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

According to one aspect, the program code that enables implementation of the disclosure can be provided as a computer program product, which includes a physical computer readable storage device having executable program code that when executed within a device having a microphone, a display and a communication component coupled to a processor executing system level firmware that supports receipt of audible and tactile input. When executed by the processor, the program code enables the device to perform the functions of: detecting a tactile input that triggers opening of a message reply interface; automatically opening both a tactile input affordance and an audio input affordance (microphone) to enable selectable use of one of the two available types of input affordances; visually indicating on a display of the device that the microphone is in active listening mode by displaying an animated icon of the microphone; monitoring for a subsequent input from among additional tactile inputs and an audible speech input; and turning off an input affordance that is not utilized to receive the subsequent input.

The computer program product also includes program code that configures the device to perform the functions of: simultaneously opening and displaying an icon representing the microphone and a virtual tactile input device (TID) when the tactile input mechanism is a virtual device; setting a timer to track an elapsed time after the simultaneous opening of the tactile input mechanism and the microphone; in response to the expiration of the time without receiving any input, closing both the tactile input mechanism and the microphone; in response to tactile manipulation of the virtual input device prior to expiration of the time, removing the microphone icon from the display; and in response to detecting audible speech input prior to expiration of the timer, removing the virtual input device from the display.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    detecting activation, on a device, of a content capturing and presenting (CCP) interface, which receives content that can be inputted via both speech-input and tactile-input;
    in response to the activation, a processor of the device automatically enabling both (i) a tactile input mechanism for capturing tactile inputs and (ii) a microphone for capturing audible speech inputs;
    simultaneously opening and displaying, on a display of the device, both an icon representing the microphone and a virtual tactile input device (TID) when the tactile input mechanism is a virtual device;
    setting a timer to track an elapsed time after the simultaneous opening of the tactile input mechanism and the microphone;
    monitoring for detection of one of (i) a tactile input, which involves use of the tactile input mechanism to input the content and (ii) audible speech, which triggers use of the microphone to input the content;

in response to tactile manipulation of the virtual tactile input device prior to expiration of the time, removing, by the processor, the microphone icon from the display and closing the microphone input; and in response to detecting audible speech, the processor: closing the tactile input mechanism; enabling capturing of the audible speech via the microphone; and presenting content corresponding to the audible speech within the CCP interface on the display of the device.

2. The method of claim 1, wherein automatically enabling the microphone further comprises providing at least one user-detectable indication that the microphone is in active listening mode, including at least one of (i) displaying an animated icon of the microphone, (ii) outputting an audible tone via a speaker of the device, (iii) performing a speech readout via the speaker, and (iv) vibrating the device.

3. The method of claim 1, further comprising:
in response to the expiration of the time without receiving any input, closing both the tactile input mechanism and the microphone on the display; and
in response to detecting audible speech input prior to expiration of the timer, removing the virtual input device from the display.

4. The method of claim 1, wherein the CCP interface is a messaging interface, and the method further comprises:
detecting activation of a message element within a messaging application that supports a messaging respondent replying to a received message via both speech-input and tactile-input;
identifying whether a last message within the message element is a received message, wherein a received message is a message that was created by another messaging participant, different from the messaging respondent, and received within the messaging element associated with the messaging respondent; and
in response to detecting audible speech as the input method, automatically forwarding content corresponding to the captured audible speech as a reply message to the received message, wherein the audible speech is audibly captured and the content corresponding to the audible speech is automatically forwarded as the reply message, without requiring tactile manipulation of the device.

5. The method of claim 4, further comprising:
in response to the last message within the message element being a received message:
identifying whether the received message has been previously accessed; and
in response to the received message not having been previously accessed:
if the received message is in text form, forwarding content of the received message to a text-to-speech engine to covert the text content to audible speech;
audibly outputting the content of the received message;
performing the automatic enabling of the tactile input mechanism and the microphone, wherein the received message is audibly outputted contemporaneously with the automatically enabling;
monitoring for detection of an input from among a tactile input and an audible speech input during the audible outputting of the received message; and
pausing the audibly outputting of the received message in response to detecting the input.

6. The method of claim 4, wherein identifying whether a last message within the message element is a received message comprises:
identifying a hierarchy of messages within the message element, which hierarchy lists an order and time sequence of entry of each message associated with the message element, including any messages generated at a respondent side of the message exchange;
identifying, as the received message, all messages in the hierarchy that were received subsequent to a most recent message generated by the messaging respondent within the message element; and
in response to multiple received messages not having been previously accessed, initiating audible outputting of the multiple received messages in sequential order from a first received to a last received message;
wherein the audible outputting of the content of the received message comprises reading out all messages identified as the received message in time order of receipt of the messages.

7. The method of claim 1, further comprising:
monitoring for a pause in detected audible speech input;
tracking an elapsed time since a last detected audible speech and comparing the elapsed time to an end-of-speech input threshold value;
in response to detecting additional audible speech input before the elapsed time exceeds the threshold value, adding content corresponding to the detected additional audible speech input to previously captured content; and
when the CCP interface is a messaging interface that captures content for transmission as a message:
in response to the elapsed time exceeding the threshold value: setting a second timer; visually indicating that the content of the received audible speech is about to be transmitted to another messaging participant; and monitoring for detection of one of an audio input and a tactile input prior to expiration of the second timer;
in response to not detecting any further input prior to expiration of the second timer, automatically forwarding the content of the detected speech presented within the message to the other messaging participant;
in response to detecting a tactile input: automatically opening the tactile input mechanism and a text box of the message having the content of the detected audible speech displayed therein for editing and appending thereto; and forwarding a final content of the message when a send message option is selected within the messaging interface.

8. The method of claim 1, wherein:
the tactile input mechanism comprises at least one of a physical keyboard, a virtual keyboard, and a virtual swipe box;
the tactile input mechanism provides text content in response to user manipulation of an input affordance that is associated with one of the device and the application;
a device setting includes a default reply setting that supports a text based reply to the received message and is configurable to a second reply setting that enables user selection of the microphone for speech based reply when responding to the received message, based on detection of user initiation of audible speech following audible outputting of the received message; and the device setting includes a setting that supports reading out of received messages.

9. A device comprising:
a plurality of input devices including a speaker, a microphone capable of capturing audible speech inputs, and at least one tactile input mechanism;
a display device capable of displaying a plurality of user interfaces and affordances;
a memory comprising a firmware and at least one application that generates a content capturing and presenting (CCP) interface, which receives content that can be inputted via both speech-input and tactile-input;
a processor that is communicatively coupled to the speaker, the microphone, the display device, the tactile input mechanism, and the memory, and which executes program code of the firmware and the application to activate the CCP interface;
a user interface controller communicatively connected with the plurality of input devices and the processor and that detects activation of the CCP interface, wherein:
the user interface controller, in response to detecting the activation of the CCP interface, triggers activation of both (i) a tactile input mechanism that captures tactile inputs and (ii) a microphone that captures audible speech inputs;
the user interface controller simultaneously opens and displays, on the display device, both an icon representing the microphone and a virtual tactile input device (TID) when the tactile input mechanism is a virtual device;
the processor sets a timer to track an elapsed time after the simultaneous opening of the tactile input mechanism and the microphone;
the user interface controller monitors for detection of one of (i) a tactile input, detected at the tactile input mechanism, which involves use of the tactile input mechanism to input the content and (ii) audible speech, captured via the microphone, which triggers use of the microphone to input the content;
in response to tactile manipulation of the virtual input device prior to expiration of the time, the user interface controller removes the microphone icon from the display and closes the microphone input; and
in response to detecting audible speech, the user interface controller: closes the tactile input mechanism; and captures the audible speech via the microphone; and
the processor presents content corresponding to the audible speech within the CCP interface on the display device.

10. The device of claim 9, wherein, contemporaneously with automatically enabling the microphone, the processor provides user-detectable indication that the microphone is in active listening mode, by at least one of (i) displaying an animated icon of the microphone, outputting an audible tone, (iii) performing a speech readout, and (iv) vibrating the device.

11. The device of claim 9, wherein:
in response to the expiration of the time without receiving any input, the user interface controller closes both the tactile input mechanism and the microphone; and
in response to detecting audible speech input prior to expiration of the timer, the user interface controller removes the virtual input device from the display.

12. The device of claim 9, wherein:
the CCP interface is a messaging interface; and
the user interface controller:
detects activation of a message element within a messaging application that supports a messaging respondent replying to a received message via both speech-input and tactile-input;
identifies whether a last message within the message element is a received message, wherein a received message is a message that was created by another messaging participant, different from the messaging respondent, and received within the messaging element associated with the messaging respondent; and
in response to detecting audible speech as the input method, automatically forwards content corresponding to the captured audible speech as a reply message to the received message, wherein the audible speech is audibly captured and the content corresponding to the audible speech is automatically forwarded as the reply message, without requiring tactile manipulation of the device.

13. The device of claim 12, wherein:
in response to the last message within the message element being a received message, the user interface controller:
identifies whether the received message has been previously accessed; and
in response to the received message not having been previously accessed:
if the received message is in text form, forwards content of the received message to a text-to-speech engine to covert the text content to audible speech;
audibly outputs the content of the received message;
performs the automatic enabling of the tactile input mechanism and the microphone, wherein the received message is audibly outputted contemporaneously with the automatically enabling;
monitors for detection of an input from among a tactile input and an audible speech input during the audible outputting of the received message; and
pauses the audibly outputting of the received message in response to detecting the input.

14. The device of claim 12, wherein in identifying whether a last message within the message element is a received message, the processor:
identifies a hierarchy of messages within the message element, which hierarchy lists an order and time sequence of entry of each message associated with the message element, including any messages generated at a respondent side of the message exchange;
identifies as the received message all messages in the hierarchy that were received subsequent to a most recent message generated by the messaging respondent within the message element; and
in response to multiple received messages not having been previously accessed, initiates audible outputting of the multiple received messages in sequential order from a first received to a last received message;
wherein the audible outputting of the content of the received message comprises reading out all messages identified as the received message in time order of receipt of the messages.

15. The device of claim 9, wherein:
the user interface controller monitors for a pause in detected audible speech input;
the processor tracks an elapsed time since a last detected audible speech and compares the elapsed time to an end-of-speech input threshold value;

in response to detecting additional audible speech input before the elapsed time exceeds the threshold value, the processor adds content corresponding to the detected additional audible speech input to previously captured content; and when the CCP interface is a messaging interface that captures content for transmission as a message:
in response to the elapsed time exceeding the threshold value: the processor setting a second timer; the processor visually indicates that the content of the received audible speech is about to be transmitted to another messaging participant; and the user interface controller monitors for detection of one of an audio input and a tactile input prior to expiration of the second timer;

in response to not detecting any further input prior to expiration of the second timer, the processor automatically forwards the content of the detected speech presented within the message to the other messaging participant;

in response to detecting a tactile input: the user interface controller automatically opens the tactile input mechanism and a text box of the message having the content of the detected audible speech displayed therein for editing and appending thereto; and the processor forwards a final content of the message when a send message option is selected within the messaging interface.

16. The device of claim 9, wherein:

the tactile input mechanism comprises at least one of a physical keyboard, a virtual keyboard, and a virtual swipe box;

the tactile input mechanism provides text content in response to user manipulation of an input affordance that is associated with one of the device and the application;

a device setting includes a default reply setting that supports a text based reply to the received message and is configurable to a second reply setting that enables user selection of the microphone for speech based reply when responding to the received message, based on detection of user initiation of audible speech following audible outputting of the received message; and the device setting includes a setting that supports reading out of received messages.

17. A computer program product comprising:

a physical computer readable storage device having executable program code that when executed within a device having a microphone, a display and a communication component coupled to a processor executing system level firmware that supports receipt of audible and tactile input, the program code enables the device to perform the functions of:

detecting a tactile input that triggers opening of a message reply interface;

automatically opening both a tactile input affordance and an audio input affordance (microphone) to enable selectable use of one of two available types of input affordances;

simultaneously opening and displaying an icon representing the microphone and a virtual tactile input device (TID) when the tactile input mechanism is a virtual device;

visually indicating on a display of the device that the microphone is in active listening mode by displaying an animated icon of the microphone;

setting a timer to track an elapsed time after the simultaneous opening of the tactile input mechanism and the microphone;

monitoring for a subsequent input from among additional tactile inputs and an audible speech input;

in response to tactile manipulation of the virtual input device prior to expiration of the time, removing the microphone icon from the display; and turning off an input affordance that is not utilized to receive the subsequent input.

18. The computer program product of claim 17, further comprising program code that configures the device to perform the functions of:

in response to the expiration of the time without receiving any input, closing both the tactile input mechanism and the microphone;

in response to detecting audible speech input prior to expiration of the timer, removing the virtual input device from the display.

* * * * *